April 23, 1968     C. M. HIRST, JR     3,379,074
LEVER OPERATED ACTUATOR MEANS
Filed May 3, 1966     2 Sheets-Sheet 1
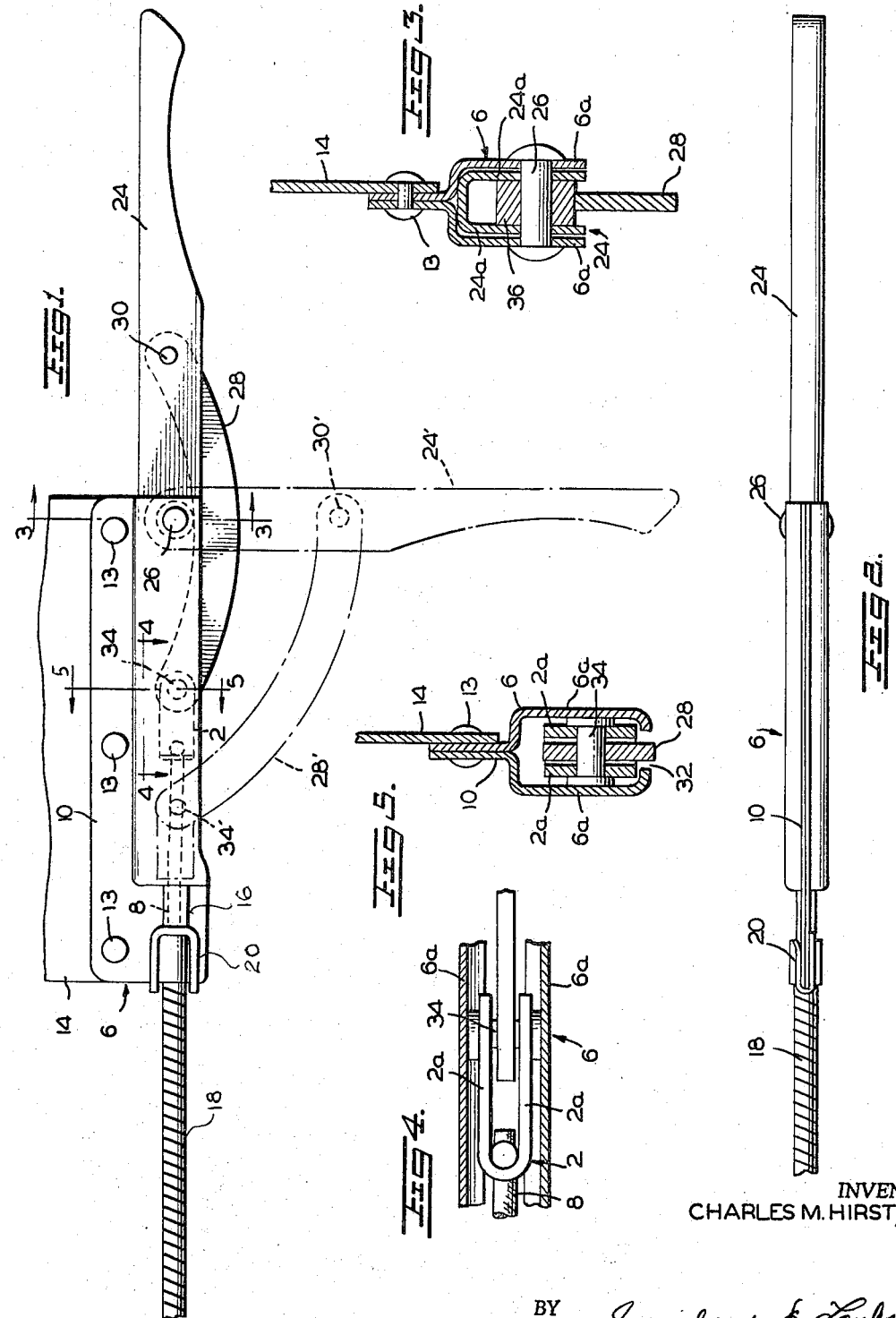
INVENTOR
CHARLES M. HIRST, JR.
ATTORNEYS

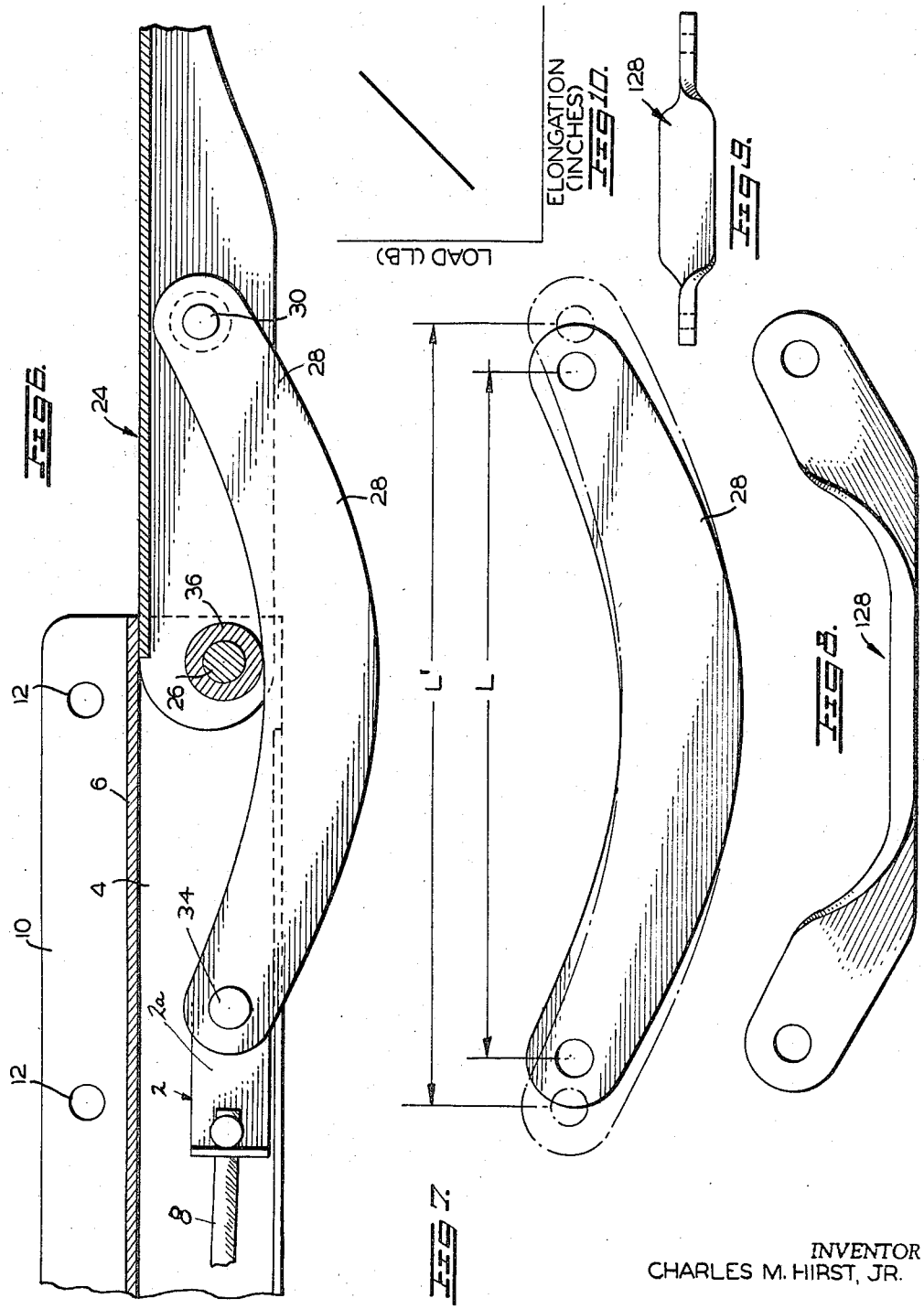

United States Patent Office 3,379,074
Patented Apr. 23, 1968

3,379,074
LEVER OPERATED ACTUATOR MEANS
Charles M. Hirst, Jr., Moberly, Mo., assignor to Orscheln Brake Lever Mfg. Company, Moberly, Mo., a corporation of Missouri
Filed May 3, 1966, Ser. No. 547,272
3 Claims. (Cl. 74—470)

This invention relates generally to lever operated actuator means for displacing a first member generally longitudinally of a second member, and more particularly to actuator means including a resilient link having controlled load-responsive elongation for connecting with the manually operated lever a load-bearing first member that is longitudinally displaceable relative to a stationary second member to which the lever is pivotally connected. As a consequence of the present invention, the actuating means are automatically self-compensated for wear of the vehicle brakes during use.

As evidenced by the U.S. Patents Nos. 2,171,403 and 2,464,096, among others, it is well known in the brake lever operator art to provide overcenter toggle or cam type linkages for actuating a vehicle brake system from a "released" to a "locked" condition. While in the past it was generally necessary to include adjustment means in the actuator linkage to compensate for wear in the vehicle brakes (which often resulted in a variation of about one and one-fourth inches in the brake cable actuation), as a consequence of the recent adoption of self-adjusting brakes, it is now possible to use a less complex and more economical actuator for locking the brakes when the vehicle is at rest. Thus in recent self-adjusting brake systems, the variation in brake cable actuation is normally on the order of one-quarter of an inch, whereby the use of the simplified, relatively inexpensive overcenter brake operating linkage of the present invention is permitted.

The primary object of the present invention is to provide in a brake cable operator arrangement of the overcenter type including a resilient link that is adapted for controlled elongation as a function of the load on the brake cable. In accordance with the present invention, the resilient link connects with the manually operated brake lever a first member that is secured to one end of the brake cable, said first member being guided for longitudinal displacement relative to a second member to which the lever is pivotally connected. The link is so designed that as the lever is pivoted from a "released" position angularly arranged relative to the second member to an overcenter "locked" position arranged generally colinearly relative thereto, the link elongates a controlled amount as a function of the brake cable load, which is generally on the order of 700 to 3000 pounds of tensile stress.

According to a more specific object of the invention, the resilient link includes an intermediate portion arranged for abutting engagement with stop means associated with the pivot pin which connects the lever with the second member, whereby pivotal movement of the lever beyond the overcenter locked position is avoided in a positive, reliable manner. In the preferred embodiment of the invention, the resilient link is planar and is formed from a sheet of suitable metal, such as spring steel, said link having a generally bow-shaped configuration the concave surface of which faces the aforementioned pivot pin between the lever and the second member. In another embodiment of the invention, the sheet metal link is generally C-shaped and includes a pair of coplanar end portions that are joined by a connecting portion lying in a plane normal to the end portions.

A more specific object of the invention is to provide a self-compensating resilient connecting link of the type described above having a substantially linear load-elongation curve, whereby controlled elongation of the link as a function of the load on the brake cable is achieved.

Other objects and advantages of the invention will become apparent from a study of the following specification when considered in conjunction with the accompanying drawing, in which:

FIGURE 1 is a side elevational view of the brake operating lever mechanism, the lever being illustrated in the locked and released positions by solid and phantom lines, respectively;

FIGURE 2 is a top plan view of the apparatus of FIGURE 1;

FIGURES 3–5 are sectional views taken along lines 3—3, 4—4 and 5—5, respectively, of FIGURE 1;

FIGURE 6 is a detailed sectional view illustrating the position of the link and the associated components when the lever is in the overcenter locked position;

FIGURE 7 is a side elevational view of the link of FIGURES 1–6, said link being illustrated in its normal unstressed and elongated configurations by the solid and phantom lines, respectively;

FIGURES 8 and 9 are side elevational and top plan views, respectively, of another link embodiment; and FIGURE 10 is a load elongation curve of a link according to the present invention.

Referring now to the drawings, the brake operating lever mechanism includes a U-shaped first member 2 that is mounted for sliding movement within a longitudinal guide chamber 4 contained within a channel-shaped body or second member 6, the bridging portion of said first member being rigidly connected with one end of a load-bearing actuated element 8, such as a brake cable, rod or the like. Extending vertically from the upper portion of the body 6 is a longitudinal flange 10 containing apertures 12 by means of which the body is secured by fasteners 13 (for example, by bolts, screws, rivets or the like) to a fixed support 4, such as a portion of the chassis frame of a vehicle. As is conventional in the art, the actuating element 8 extends through an outlet passage 16 contained in one end of the body 6 and is slidably guided within a concentrically arranged protective sheath 18 that is secured to body 6 by a resilient clip 20. When the element 8 comprises a brake cable, the other end thereof (not shown) is connected with the conventional brake means of the vehicle.

Pivotally connected at one end between the side walls 6a at the other end of the body 6 is a channel-shaped hand lever 24 that pivots about pivot pin 26 from the illustrated locked position to an angularly arranged released position illustrated by the phantom lines in FIGURE 1.

In accordance with the present invention, a resilient planar sheet metal link 28 having a configuration adapted for elongation under tensile stress is pivotally connected at one end between the side walls of lever 24 by a second pivot pin 30. At the other end, the link 28 extends through a longitudinal slot 32 in the bottom of body 6 and is connected between the legs 2a of the first member 2 by a third pivot pin 34. As shown in FIGURES 3 and 6, the configuration of the link 28 is such that when the lever is pivoted to the illustrated locked position, an intermediate portion of the link 28 abuts a stop sleeve 36 mounted concentrically upon pivot pin 26, thereby preventing pivotal movement of the lever beyond the illustrated locked position. As shown in FIGURES 1 and 6, the axis of pin 26 is on one side of the plane containing pins 30 and 34 when the lever is in the overcenter locked position, and on the other side of the said plane when the lever is in the angularly arranged released position.

As is shown in FIGURE 7, the resilient link 28, which is normally formed from a sheet of spring steel or other suitable metal, is planar throughout its length and has a generally bow-shaped configuration the concave surface of which faces pivot pin 26. The effective length of the link increases from L to L' as the link is elongated by the brake cable load when the lever 24 is pivoted to the overcenter locked position. In accordance with the present invention, and as shown in FIGURE 10, the design and selection of materials of the resilient link is such that the load-elongation curve of the link is generally linear throughout the specific range of application of the system.

Of course, other designs and types of resilient links may be utilized in the lever systems of the present invention. In the alternate embodiment of FIGURES 8 and 9, the link 128, which is also formed from spring steel or the like, includes a pair of coplanar end portions that are joined by a central portion which lies in a plane normal to the plane containing the end portions.

While in accordance with the provisions of the patent statutes, I have illustrated and describe the preferred form and embodiment of the invention, it will be apparent to those skilled in the art that various changes and modifications may be made in the apparatus described without deviating from the invention set forth in the following claims.

What is claimed is:

1. Operating means for displacing a first load-bearing member generally longitudinally of a second member, comprising
    a lever;
    means including a first pivot pin pivotally connecting one end of said lever with said second member;
    a rigid metal resilient link having a normal first configuration and being adapted for elongation under tensile stress said link having a substantially linear load-elongation curve;
    means including a second pivot pin pivotally connecting one end of said link with a portion of said lever intermediate the ends thereof; and
    means including a third pivot pin pivotally connecting the other end of said link with said first member, the axes of said first, second and third pivot pins being parallel;
    said lever being pivotable form an unlocked position in which the lever is angularly arranged relative to said second member and said first pivot pin is on one side of the plane containing said second and third pivot pins toward an overcenter locked position in which the lever is generally colinearly arranged relative to said second member and said first pivot pin is on the other side of the plane containing said second and third pivot pins, said first member being displaced in the direction of said first pivot pin when the lever is pivoted from the unlocked to the locked position;
    said link being elongated to increase the distance between the second and third pivot pins as a direct function of the load on said first member when said lever is pivoted from the unlocked to the locked position.

2. Apparatus as defined in claim 1 wherein said link comprises a planar sheet metal element having a generally bow-shaped configuration the concave surface of which faces said first pivot pin.

3. Apparatus as defined in claim 1 wherein said link comprises a generally U-shaped sheet metal element having a pair of coplanar end portions joined by a central portion lying in a plane normal to the plane containing said end portions.

References Cited

UNITED STATES PATENTS

| | | | |
|---|---|---|---|
| 1,969,872 | 8/1934 | Bowen | 188—152 |
| 2,464,096 | 4/1949 | Orscheln | 74—518 |

FRED C. MATTERN, Jr., *Primary Examiner.*

B. T. CALLAHAN, *Assistant Examiner.*